(12) United States Patent
Kim

(10) Patent No.: US 12,506,072 B2
(45) Date of Patent: *Dec. 23, 2025

(54) SEMICONDUCTOR DEVICE INCLUDING THREE-DIMENSIONAL MEMORY CELLS

(71) Applicant: SK hynix Inc., Gyeonggi-do (KR)

(72) Inventor: Seung Hwan Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 728 days.

This patent is subject to a terminal disclaimer.

(21) Appl. No.: 17/842,267

(22) Filed: Jun. 16, 2022

(65) Prior Publication Data

US 2023/0207460 A1    Jun. 29, 2023

(30) Foreign Application Priority Data

Dec. 23, 2021    (KR) .................. 10-2021-0186190

(51) Int. Cl.
| | | |
|---|---|---|
| H10B 12/00 | (2023.01) | |
| G11C 5/06 | (2006.01) | |
| H01L 23/528 | (2006.01) | |
| H01L 23/532 | (2006.01) | |

(52) U.S. Cl.
CPC .......... *H01L 23/5283* (2013.01); *G11C 5/063* (2013.01); *H10B 12/30* (2023.02); *H01L 23/53257* (2013.01); *H01L 23/53271* (2013.01); *H10B 12/482* (2023.02); *H10B 12/488* (2023.02)

(58) Field of Classification Search
CPC ..... H01L 23/5283; H10B 12/30; H10B 12/48; H10B 12/482; H10B 12/485; H10B 12/488

See application file for complete search history.

(56) References Cited

U.S. PATENT DOCUMENTS

| | | | |
|---|---|---|---|
| 10,607,995 | B2 | 3/2020 | Roberts et al. |
| 12,048,144 | B2* | 7/2024 | Ryu ............... H10B 12/36 |
| 2014/0097484 | A1 | 4/2014 | Seol et al. |
| 2021/0159229 | A1 | 5/2021 | Gomes et al. |
| 2021/0202703 | A1 | 7/2021 | Rajashekhar et al. |

FOREIGN PATENT DOCUMENTS

| | | |
|---|---|---|
| CN | 101764122 A | 6/2010 |
| CN | 108231786 A | 6/2018 |
| CN | 116156877 A | 5/2023 |
| KR | 10-2000-0066346 A | 11/2000 |
| KR | 10-2021-0084643 A | 7/2021 |
| TW | 202139426 A | 10/2021 |

OTHER PUBLICATIONS

Office Action for Korean Patent Application No. 10-2021-0186190 issued by the Korean Intellectual Property Office (KIPO) on Jul. 16, 2025.
Office Action for Chinese Patent Application No. 202211402871.7 issued by the Chinese Patent Office on Oct. 22, 2025.

* cited by examiner

*Primary Examiner* — Reema Patel
(74) *Attorney, Agent, or Firm* — IP & T GROUP LLP

(57) ABSTRACT

A semiconductor device includes: a conductive line stack including a plurality of double conductive lines stacked over a substrate in a direction perpendicular to a surface of the substrate; conductive line pads laterally oriented between edge portions of each of the double conductive lines; and a contact plug contacting the edge portions of the double conductive lines.

20 Claims, 14 Drawing Sheets

SEMICONDUCTOR DEVICE INCLUDING THREE-DIMENSIONAL MEMORY CELLS

CROSS-REFERENCE TO RELATED APPLICATIONS

The present application claims priority of Korean Patent Application No. 10-2021-0186190, filed on Dec. 23, 2021, which is incorporated herein by reference in its entirety.

BACKGROUND

1. Field

Various embodiments of the present invention relate to a semiconductor device, and more particularly, to a semiconductor device including three-dimensional memory cells.

2. Description of the Related Art

In order to increase the net die of a memory device, the size of a memory cell is being reduced continuously. As the size of the memory cell is being miniaturized, the parasitic capacitance (Cb) needs to be reduced and the capacitance needs to be increased. However, it is difficult to increase the net die due to the structural limitations of memory cells.

Recently, three-dimensional semiconductor devices including memory cells that are arranged in three dimensions are being suggested.

SUMMARY

Embodiments of the present invention are directed to a semiconductor device including highly integrated memory cells.

In accordance with an embodiment of the present invention, a semiconductor device includes: a conductive line stack including a plurality of double conductive lines stacked over a substrate in a direction perpendicular to a surface of the substrate; conductive line pads laterally oriented between edge portions of each of the double conductive lines; and a contact plug contacting the edge portions of the double conductive lines.

In accordance with another embodiment of the present invention, a semiconductor device includes: a word line stack including a plurality of double word lines that are stacked over a substrate in a direction perpendicular to a surface of the substrate; word line pads that are laterally oriented between edge portions of each of the double word lines; a plurality of active layers disposed between the double word lines and laterally spaced apart from each other in a direction that the double word lines extend; a bit line commonly coupled to first end portions of the active layers and extending in a direction perpendicular to the surface of the substrate; and capacitors respectively coupled to the second end portions of the active layers.

In accordance with another embodiment of the present invention, a semiconductor device includes: a plurality of double conductive lines stacked over a substrate, each double conductive line including a pair of first conductive lines facing each other; a plurality of conductive line pads, each conductive line pad being disposed between a respective pair of the first conductive lines at edge portions of each of the double conductive lines; a plurality of contact plugs contacting the edge portions of the double conductive lines, respectively; a plurality of active layers disposed between the double conductive lines, respectively, and laterally spaced apart from each other in a direction that the double conductive lines are stacked; a second conductive line commonly coupled to first end portions of the active layers and extending in a direction perpendicular to the surface of the substrate; and a plurality of capacitors respectively coupled to second end portions of the active layers.

In accordance with yet another embodiment of the present invention, a method for fabricating a semiconductor device includes: forming an inter-layer dielectric layer over a substrate; forming a stack body in which a first lateral level dielectric layer, a first word line, an active layer, a second word line, and a second lateral level dielectric layer are stacked in the mentioned order over the inter-layer dielectric layer; forming a pad-shaped opening between the first word line and the second word line by removing the first word line and the active layer; and forming a word line pad filling the pad-shaped opening.

The forming of the pad-shaped opening may include: forming a slit-type opening that divides the stack body into a first word line edge portion and a second word line edge portion; forming an insulating slit to fill the slit-type opening; forming a pad separation opening between the first word line edge portion and the second word line edge portion by etching a portion of the slit; and removing the active layer through the pad separation opening.

The pad separation opening may extend perpendicular to the surface of the substrate, and the pad-shaped opening may extend laterally from the pad separation opening.

Edge portions of the double word lines and the word line pads may have a stepped shape.

The double word lines and word line pads may include a metal-based material.

Each of the word line pads may include a first end portion and a second end portion, and the first end portions of the word line pads may be vertically self-aligned, and the second end portions of the word line pads may be non-aligned while having a stepped shape.

The edge portions of the double conductive lines and the conductive line pads may be in direct contact to each other.

These and other features and advantages of the present invention will become apparent to the skilled person in the art from the following figures and detailed description of embodiments of the present invention.

DETAILED DESCRIPTION

Figure 1:
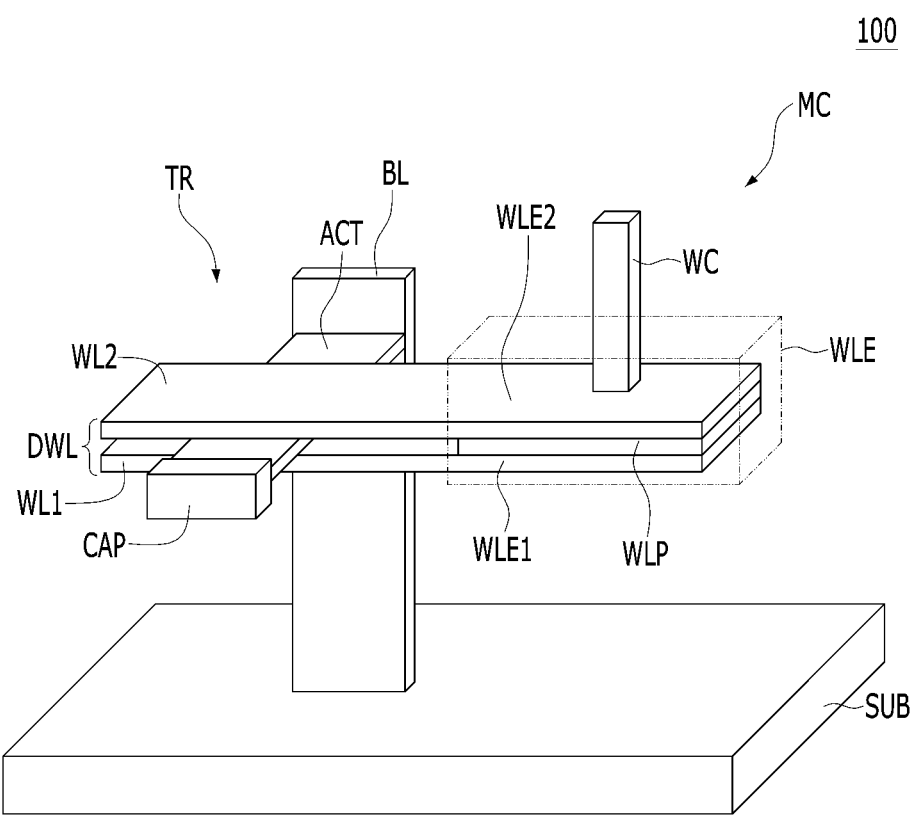
FIG. 1 is a schematic perspective view illustrating a semiconductor device in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

According to the following embodiment of the present invention, memory cells may be vertically stacked to increase memory cell density and reduce parasitic capacitance.

Figure 2:
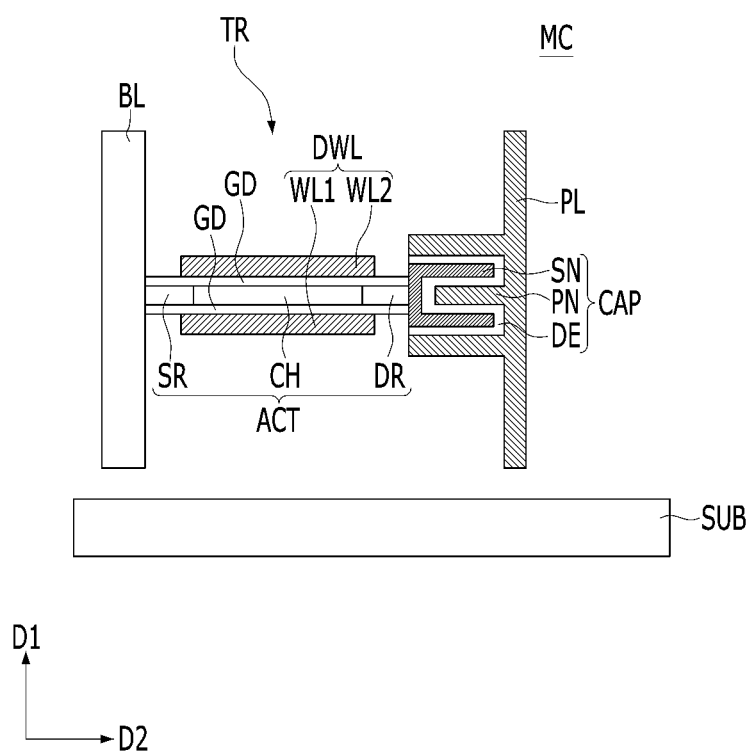
FIG. 2 is a schematic cross-sectional view illustrating the memory cell of FIG. 1.

FIG. 1 is a schematic perspective view illustrating a semiconductor device in accordance with an embodiment of the present invention. FIG. 2 is a schematic cross-sectional view illustrating the memory cell of FIG. 1.

Referring to FIG. 1, the semiconductor device 100 may include a conductive line stack DWL including a pair of first conductive lines WL1 and WL2 that are stacked over a substrate SUB in a direction perpendicular to the surface of the substrate SUB, a conductive pad WLP interposed between the edge portions WLE1 and WLE2 of the first conductive lines WL1 and WL2, a contact plug WC contacting the edge portion WLE of the conductive line stack DWL, a second conductive line BL extending in a direction perpendicular to the surface of the substrate SUB over the substrate SUB, and a conductive layer ACT laterally oriented in a direction crossing the first conductive lines WL1 and WL2. The first conductive lines WL1 and WL2 are also referred to herein as first and second sub conductive lines WL1 and WL2. The pair of the first conductive lines WL1 and WL2 may include a pair of the first sub conductive line WL1 and the second sub conductive line WL2. The edge portion WLE1 of the first conductive line WL1 may be referred to as an edge portion WLE1 of the first sub conductive line WL1. The edge portion WLE2 of the first conductive line WL2 may be referred to as an edge portion WLE2 of the second sub conductive line WL2. The contact plug WC may be coupled to the edge portion WLE2 of the second sub conductive line WL2. The first sub conductive line WL1 may be disposed on the upper surface of the laterally oriented conductive layer ACT, and the second sub conductive line WL2 may be disposed on the lower surface of the laterally oriented conductive layer ACT.

The semiconductor device 100 may include memory cells MC, and the memory cells MC may include Dynamic Random Access Memory (DRAM) cells. Hereinafter, the first conductive lines WL1 and WL2 are also referred to herein as first and second word lines WL1 and WL2, and the second conductive line BL is also referred to herein as a bit line BL. The conductive line stack DWL is also referred to herein as a double word line DWL. The conductive pad WLP is also referred to herein as a word line pad WLP. The laterally oriented conductive layer ACT is also referred to herein as an active layer ACT. The double word line DWL may include a pair of a first word line WL1 and a second word line WL2. The first word line WL1 and the second word line WL2 may be oriented laterally with the active layer ACT between them.

Referring to FIGS. 1 and 2, the semiconductor device 100 may include a substrate SUB and a memory cell MC formed over the substrate SUB. The memory cell MC may be disposed at a higher level than the substrate SUB. The memory cell MC may include a bit line BL, a transistor TR, and a capacitor CAP. The transistor TR may include an active layer ACT and a double word line DWL. The double word line DWL may include a first word line WL1 and a second word line WL2 facing each other with the active layer ACT interposed between them. The capacitor CAP may include a storage node SN, a plate node PN and a dielectric layer DE disposed between the storage node SN and the plate node PN.

The bit line BL may extend in a first direction D1. The first direction D1 may be perpendicular to the surface of the substrate SUB.

The active layer ACT may extend in a second direction D2. The second direction D2 may be parallel to the surface of the substrate SUB. The double word line DWL may extend in a third direction D3. The third direction D3 may be parallel to the surface of the substrate SUB, and the third direction D3 may intersect with the first and second directions D1 and D2. The first, second, and third directions D1, D2, and D3 may be orthogonal to each other, however, the present invention is not limited only to such orthogonal configuration.

The bit line BL may be vertically oriented in the first direction D1. The bit line BL may be referred to as a vertically oriented bit line or a pillar-shaped bit line. The bit line BL may include a conductive material. The bit line BL may include a silicon-based material, a metal-based material, or a combination thereof. The bit line BL may include silicon, a metal, a metal nitride, a metal silicide, or a combination thereof. The bit line BL may include polysilicon, titanium nitride, tungsten, or a combination thereof. For example, the bit line BL may include polysilicon or titanium nitride (TiN) doped with an N-type impurity. The bit line BL may include titanium nitride and tungsten. For example, the bit line BL may include a 'TiN/W stack' including a titanium nitride layer and a tungsten layer disposed over the titanium nitride layer.

The double word line DWL may extend in the third direction D3. The active layer ACT may extend in the second direction D2. The active layer ACT may be arranged laterally in the second direction D2 from the bit line BL. The double word line DWL may include a pair of word lines, for example, a first word line WL1 and a second word line WL2. The first word line WL1 and the second word line WL2 may face each other in the first direction D1 with the active layer ACT interposed between them.

The active layer ACT may be oriented laterally between the bit line BL and the capacitor CAP. A first side of the active layer ACT may be coupled to the bit line BL, and a second side of the active layer ACT may be coupled to the capacitor CAP. The active layer ACT may include a semiconductor material or an oxide semiconductor material. For example, the active layer ACT may include silicon, monocrystalline silicon, polysilicon, germanium, silicon-germanium, or indium gallium zinc oxide (IGZO).

The active layer ACT may include a channel CH, a first source/drain region SR between the channel CH and the bit line BL, and a second source/drain region DR between the channel CH and the capacitor CAP. The channel CH may be defined between the first source/drain region SR and the second source/drain region DR. The channel CH and the double word line DWL may vertically overlap with each other in the first direction D1. The channel CH may extend laterally in the second direction D2.

The first source/drain region SR and the second source/drain region DR may be doped with an impurity of the same conductivity type. The first source/drain region SR and the second source/drain region DR may be doped with an N-type impurity or a P-type impurity. The first source/drain region SR and the second source/drain region DR may include at least one impurity selected among arsenic (As), phosphorus (P), boron (B), indium (In), and a combination thereof. The first source/drain region SR may contact the bit line BL, and the second source/drain region DR may contact the storage node SN of the capacitor CAP.

The transistor TR may be a cell transistor and may have a double word line DWL. In the double word line DWL, the first word line WL1 and the second word line WL2 may have the same potential. For example, the first word line WL1 and the second word line WL2 may form a pair, and the same word line driving voltage may be applied to the first word line WL1 and the second word line WL2. The first word line WL1 and the second word line WL2 may be coupled to each other by the word line pad WLP, and the same word line driving voltage may be applied by the contact plug WC.

As described above, the memory cell MC according to an embodiment of the present invention may have a double word line DWL in which the first and second word lines WL1 and WL2 are disposed adjacent to one channel CH.

The active layer ACT may have a smaller thickness than the first and second word lines WL1 and WL2. In other words, the vertical thickness of the active layer ACT in the first direction D1 may be smaller than the vertical thickness of each of the first and second word lines WL1 and WL2 in the first direction D1. The thin active layer ACT described above may be referred to as a thin-body active layer. The thin active layer ACT may include the thin-body channel CH, and the thin-body channel CH may have a thickness of approximately 10 nm or less. According to another embodiment of the present invention, the channel CH may have the same vertical thickness as that of each of the first and second word lines WL1 and WL2.

The upper and lower surfaces of the active layer ACT may have a flat surface. In other words, the upper and lower surfaces of the active layer ACT may be parallel to each other in the second direction D2.

A gate dielectric layer GD may be formed between the first word line WL1 and the active layer ACT and between the second word line WL2 and the active layer ACT. The gate dielectric layer GD may include silicon oxide, silicon nitride, a metal oxide, a metal oxynitride, a metal silicate, a high-k material, a ferroelectric material, an anti-ferroelectric material or a combination thereof. The gate dielectric layer GD may include $SiO_2$, $Si_3N_4$, $HfO_2$, $Al_2O_3$, $ZrO_2$, AlON, HfON, HfSiO, HfSiON, or HfZrO.

Each of the first and second word lines WL1 and WL2 may include a metal, a metal alloy, or a semiconductor material. Each of the first and second word lines WL1 and WL2 may include titanium nitride, tungsten, polysilicon, or a combination thereof. For example, each of the first and second word lines WL1 and WL2 may include a TiN/W stack in which titanium nitride and tungsten are sequentially stacked. Each of the first and second word lines WL1 and WL2 may include an N-type work function material or a P-type work function material. The N-type work function material may have a low work function of approximately 4.5 eV or less, and the P-type work function material may have a high work function of approximately 4.5 eV or more.

The capacitor CAP may be disposed laterally from the transistor TR in the second direction D2. The capacitor CAP may include a storage node SN extending laterally from the active layer ACT in the second direction D2. The capacitor CAP may further include a dielectric layer DE and a plate node PN over the storage node SN. The storage node SN, the dielectric layer DE, and the plate node PN may be arranged laterally in the second direction D2. The storage node SN may have a laterally oriented cylinder-shape. The dielectric layer DE may conformally cover the cylindrical inner wall and the cylindrical outer wall of the storage node SN. The plate node PN may have a shape extending to the cylindrical inner wall and the cylindrical outer wall of the storage node SN over the dielectric layer DE. The storage node SN may be electrically connected to the second source/drain region DR. The plate node PN may be coupled to the plate line PL. The plate node PN and the plate line PL may be formed of the same material and may have an integrated structure.

The storage node SN may have a three-dimensional structure, and the storage node SN of a three-dimensional structure may have a lateral three-dimensional structure which is oriented in the second direction D2. As an example of the three-dimensional structure, the storage node SN may have a cylindrical shape. According to another embodiment of the present invention, the storage node SN may have a pillar shape or a pylinder shape. The pylinder shape may refer to a structure in which a pillar shape and a cylinder shape are merged.

The storage node SN and the plate node PN may include a metal, a noble metal, a metal nitride, a conductive metal oxide, a conductive noble metal oxide, a metal carbide, a metal silicide, or a combination thereof. For example, the storage node SN and the plate node PN may include titanium (Ti), titanium nitride (TiN), tantalum (Ta), tantalum nitride (TaN), tungsten (W), tungsten nitride (WN), ruthenium (Ru), ruthenium oxide ($RuO_2$), iridium (Ir), iridium oxide ($IrO_2$), platinum (Pt), molybdenum (Mo), molybdenum oxide (MoO), a titanium nitride/tungsten (TiN/W) stack, a tungsten nitride/tungsten (WN/W) stack. The plate node PN may include a combination of a metal-based material and a silicon-based material. For example, the plate node PN may be a stack of titanium nitride/silicon germanium/tungsten nitride (TiN/SiGe/WN). In the titanium nitride/silicon germanium/tungsten nitride (TiN/SiGe/WN) stack, silicon germanium may be a gap-fill material that fills the inside of the cylinder of the storage node SN over titanium nitride, and titanium nitride (TiN) may serve as a plate node PN of the capacitor CAP, and tungsten nitride may be a low-resistance material.

The dielectric layer DE may include silicon oxide, silicon nitride, a high-k material, or a combination thereof. The high-k material may have a higher dielectric constant than silicon oxide. Silicon oxide ($SiO_2$) may have a dielectric constant of approximately 3.9, and the dielectric layer DE may include a high-k material having a dielectric constant of approximately 4 or more. The high-k material may have a dielectric constant of approximately 20 or more. The high dielectric constant material may include hafnium oxide ($HfO_2$), zirconium oxide ($ZrO_2$), aluminum oxide ($Al_2O_3$), lanthanum oxide ($La_2O_3$), titanium oxide ($TiO_2$), tantalum oxide ($Ta_2O_5$), niobium oxide ($Nb_2O_5$) or strontium titanium oxide ($SrTiO_3$). The dielectric layer DE may be formed as a single layer of one of the aforementioned high-k materials. The dielectric layer DE may be formed as a composite layer including two or more layers of the aforementioned high-k materials.

The dielectric layer DE may be formed of zirconium-based oxide. The dielectric layer DE may have a stack structure including at least zirconium oxide ($ZrO_2$). The stack structure including zirconium oxide ($ZrO_2$) may include a ZA ($ZrO_2/Al_2O_3$) stack or a ZAZ ($ZrO_2/Al_2O_3/ZrO_2$) stack. The ZA stack may have a structure in which aluminum oxide ($Al_2O_3$) is stacked over zirconium oxide ($ZrO_2$). The ZAZ stack may have a structure in which zirconium oxide ($ZrO_2$), aluminum oxide ($Al_2O_3$), and zirconium oxide ($ZrO_2$) are sequentially stacked. The ZA stack and the ZAZ stack may be referred to as a zirconium oxide-based layer ($ZrO_2$-based layer). According to another embodiment of the present invention, the dielectric layer DE may be formed of hafnium-based oxide (Hf-based oxide). The dielectric layer DE may have a stack structure including at least hafnium oxide ($HfO_2$). The stack structure including hafnium oxide ($HfO_2$) may include an HA ($HfO_2/Al_2O_3$) stack or an HAH ($HfO_2/Al_2O_3/HfO_2$) stack. The HA stack may have a structure in which aluminum oxide ($Al_2O_3$) is stacked over hafnium oxide ($HfO_2$). The HAH stack may have a structure in which hafnium oxide ($HfO_2$), aluminum oxide ($Al_2O_3$), and hafnium oxide ($HfO_2$) are sequentially stacked. The HA stack and the HAH stack may be referred to as a hafnium oxide-based layer ($HfO_2$-based layer). In the ZA stack, ZAZ stack, HA stack, and HAH stack, aluminum oxide ($Al_2O_3$) may have higher band gap energy (which is hereinafter simply referred to as bandgap) than zirconium oxide ($ZrO_2$) and hafnium oxide ($HfO_2$). Aluminum oxide ($Al_2O_3$) may have a lower dielectric constant than zirconium oxide ($ZrO_2$) and hafnium oxide ($HfO_2$). Accordingly, the dielectric layer DE may include a stack of a high-k material and a high-bandgap material having a greater bandgap than the high-k material. The dielectric layer DE may include silicon oxide ($SiO_2$) as another high bandgap material other than aluminum oxide ($Al_2O_3$). Since the dielectric layer DE includes a high bandgap material, leakage current may be suppressed. The high-bandgap material may be thinner than the high-k material. According to another embodiment of the present invention, the dielectric layer DE may include a laminated structure in which a high-k material and a high-bandgap material are alternately stacked. For example, a ZAZA ($ZrO_2/Al_2O_3/ZrO_2/Al_2O_3$) stack, a ZAZAZ ($ZrO_2/Al_2O_3/ZrO_2/Al_2O_3/ZrO_2$) stack, a HAHA ($HfO_2/Al_2O_3/HfO_2/Al_2O_3$) stack, or a HAHAH ($HfO_2/Al_2O_3/HfO_2/Al_2O_3/HfO_2$) stack. In the above laminated structure, the aluminum oxide ($Al_2O_3$) layer may be thinner than each of the zirconium oxide ($ZrO_2$) and hafnium oxide ($HfO_2$) layers.

According to another embodiment of the present invention, the dielectric layer DE may include a stack structure, a laminated structure, or a mixed structure including zirconium oxide, hafnium oxide, and aluminum oxide.

According to another embodiment of the present invention, the dielectric layer DE may include a ferroelectric material or an anti-ferroelectric material.

According to another embodiment of the present invention, an interface control layer (not shown) for improving leakage current may be further formed between the storage node SN and the dielectric layer DE. The interface control layer may include titanium oxide ($TiO_2$), niobium oxide, or niobium nitride. The interface control layer may also be formed between the plate node PN and the dielectric layer DE.

The capacitor CAP may include a metal-insulator-metal (MIM) capacitor. The storage node SN and the plate node PN may include a metal-based material.

The capacitor CAP may be replaced with another data storage material. For example, the data storage material may be a phase change material, a magnetic tunnel junction (MTJ), or a variable resistance material.

Referring back to FIG. 1, the double word line DWL may include a word line edge portion WLE, and the contact plug WC may be coupled to the word line edge portion WLE. The word line edge portion WLE may refer to end portions of the first and second word lines WL1 and WL2. For example, the word line edge portion WLE may include a first word line edge portion WLE1 and a second word line edge portion WLE2. The word line edge portion WLE may further include a word line pad WLP between the first word line edge portion WLE1 and the second word line edge portion WLE2. The word line pad WLP may be laterally spaced apart from the active layer ACT. The word line pad WLP may directly contact the first word line edge portion WLE1 and the second word line edge portion WLE2. The first word line edge portion WLE1, the word line pad WLP, and the second word line edge portion WLE2 may be vertically stacked in the first direction D1. An end portion of the word line edge portion WLE may include a vertical flat surface. Accordingly, the end portion of the word line pad WLP may be self-aligned with the end portion of the first word line edge portion WLE1 and the end portion of the second word line edge portion WLE2.

The first and second word line edge portions WLE1 and WLE2 may be formed of the same material as that of the first and second word lines WL1 and WL2. Each of the first and second word line edge portions WLE1 and WLE2 may include a metal, a metal alloy, or a semiconductor material. Each of the first and second word line edge portions WLE1 and WLE2 may include titanium nitride, tungsten, polysilicon, or a combination thereof. For example, each of the first and second word line edge portions WLE1 and WLE2 may include a TiN/W stack in which titanium nitride and tungsten are sequentially stacked.

The word line pad WLP may be formed of the same material as the first and second word line edge portions WLE1 and WLE2. The word line pad WLP may include a metal, a metal alloy, or a semiconductor material. The word line pad WLP may include titanium nitride, tungsten, polysilicon, or a combination thereof. For example, the word line pad WLP may include a TiN/W stack in which titanium nitride and tungsten are sequentially stacked. The first word line edge portion WL1 and the second word line edge portion WLE2 may be electrically connected to each other by the word line pad WLP.

The contact plug WC may extend vertically in the first direction D1. The contact plug WC may be directly coupled to the second word line edge portion WLE2. The contact plug WC may include a metal-based material.

Figure 3:
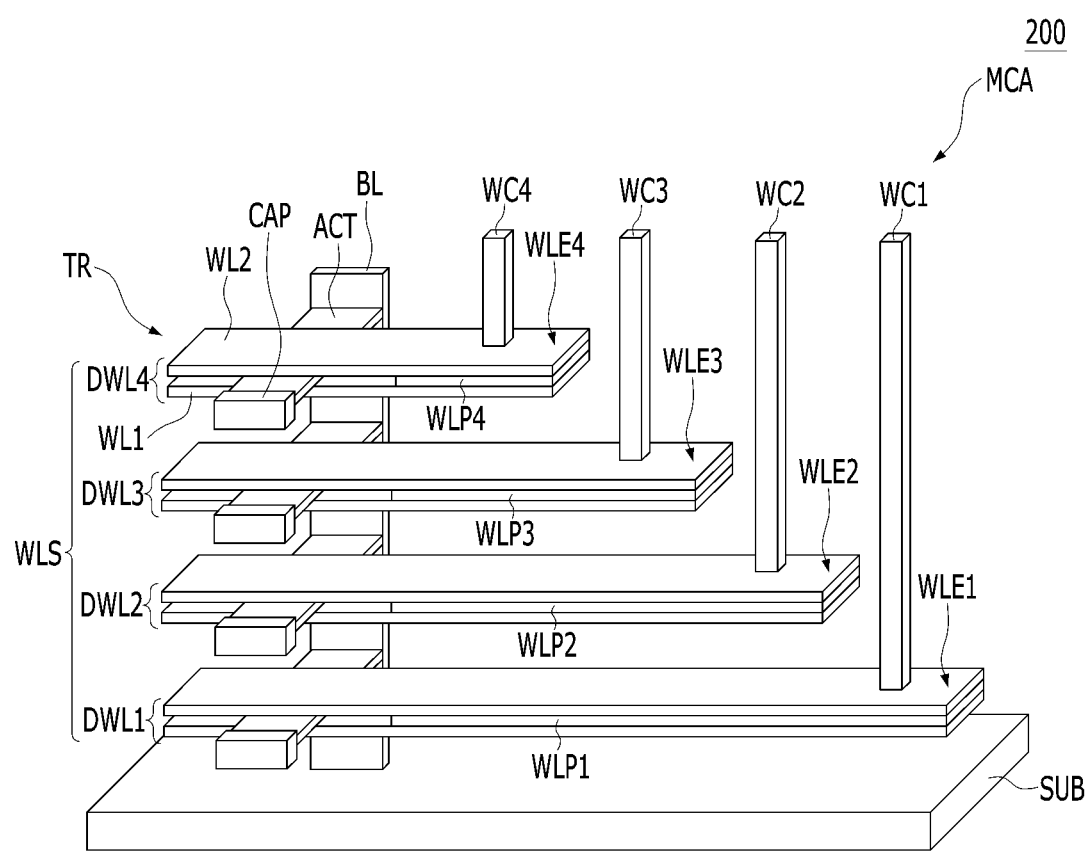
FIG. 3 is a schematic perspective view illustrating a semiconductor device in accordance with an embodiment of the present invention.
Figure 4:
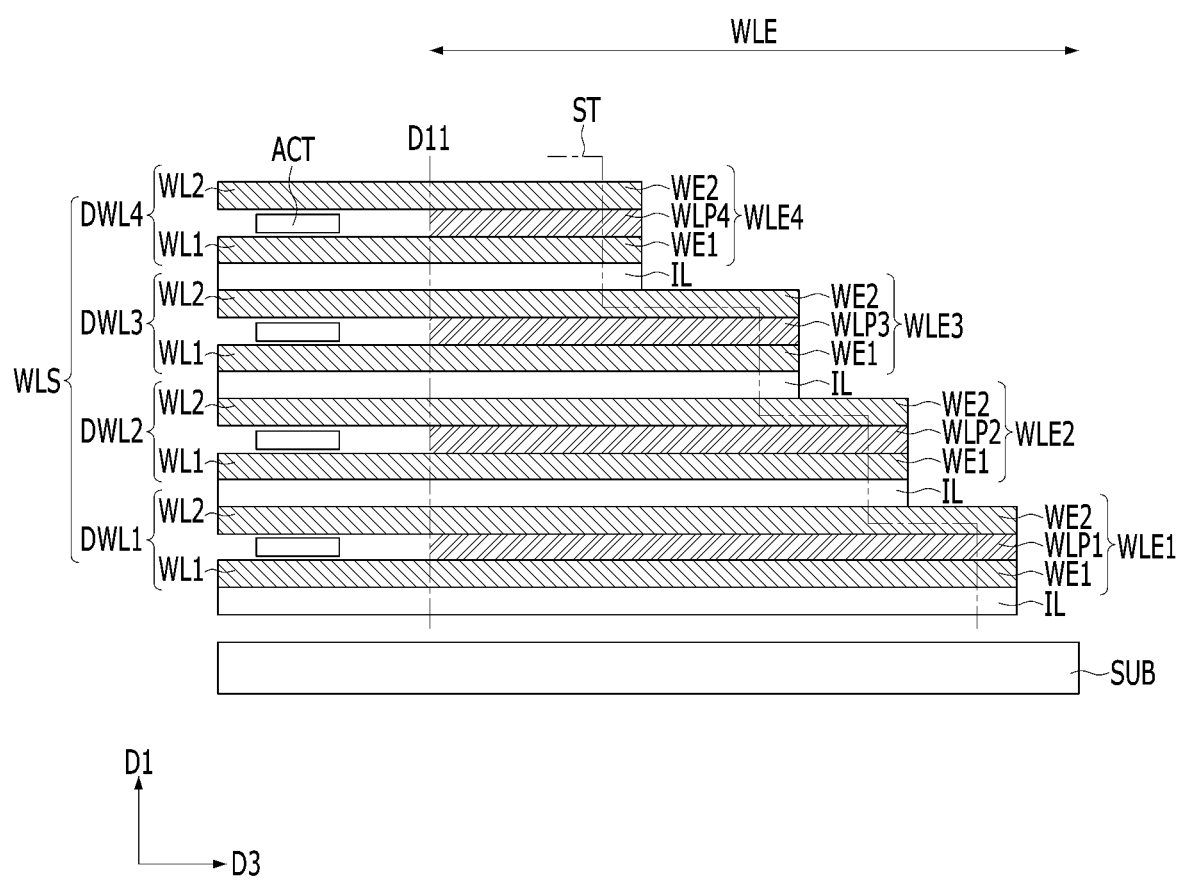
FIG. 4 is a schematic cross-sectional view illustrating a word line stack WLS of FIG. 3.

FIG. 3 is a schematic perspective view illustrating a semiconductor device in accordance with an embodiment of the present invention. FIG. 4 is a schematic cross-sectional view illustrating a word line stack WLS of FIG. 3.

Referring to FIGS. 3 and 4, the semiconductor device 200 may include a memory cell array MCA. The memory cell array MCA may include a plurality of memory cells. Here, the memory cells of the memory cell array MCA may include the memory cells MC of FIGS. 1 and 2. The memory cells MC of FIGS. 1 and 2 may be vertically stacked in the first direction D1 as shown in FIG. 3.

The memory cell array MCA may include a plurality of active layers ACT and a plurality of double word lines DWL1 to DWL4 that are vertically stacked over the substrate SUB. Each of the double word lines DWL1 to DWL4 may include a first word line WL1 and a second word line WL2 that are facing each other with the active layer ACT interposed between them. The double word lines DWL1 to DWL4 may be vertically stacked in the first direction D1 from the surface of a substrate SUB. The stack of the double word lines DWL1 to DWL4 is also referred to herein as a 'word line stack WLS'.

The memory cell array MCA may further include a bit line BL, a plurality of transistors TR, and a plurality of capacitors CAP over the substrate SUB. Each of the transistors TR may include an active layer ACT and a double word line among the double word lines DWL1 to DWL4.

The double word lines DWL1 to DWL4 may extend laterally in the third direction D3.

The word line stack WLS may include a word line edge portion WLE. The word line edge portion WLE may refer to end portions of the double word lines DWL1 to DWL4. The word line edge portions WLE may include stepped word line edge portions WLE1 to WLE4. Contact plugs WC1 to WC4 may be respectively coupled to the word line edge portions WLE1 to WLE4. The word line edge portion WLE may refer to end portions of the first and second word lines WL1 and WL2. Each of the word line edge portions WLE1 to WLE4 may include a first word line edge portion WE1 and a second word line edge portion WE2. Each of the word line edge portions WLE1 to WLE4 may further include word line pads WLP1 to WLP4. The word line pads WLP1 to WLP4 may be laterally spaced apart from the active layers ACT. The individual word line pads WLP1 to WLP4 may be formed between the first word line edge portion WE1 and the second word line edge portion WE2. The word line pads WLP1 to WLP4 may directly contact the first and second word line edge portions WE1 and WE2.

The first end portions of the word line edge portions WLE1 to WLE4 may be aligned to the first vertical level D11. The first end portions of the word line pads WLP1 to WLP4 may be aligned to the first vertical level D11. In each of the word line pads WLP1 to WLP4, second end portions of the word line pads WLP1 to WLP4 may be self-aligned to the end portions of the first and second word line edge portions WE1 and WE2.

The word line edge portion WLE of the word line stack WLS may have a stepped shape (refer to a reference symbol 'ST'). The second end portions of the word line edge portions WLE1 to WLE4 may not be aligned to each other. For example, the second end portions of the word line edge portions WLE1 to WLE4 may not be aligned to each other along the stepped shape ST.

The word line pads WLP1 to WLP4 may extend laterally in the third direction D3. The word line pads WLP1 to WLP4 may have different lateral lengths. The lateral lengths of the word line pads WLP1 to WLP4 may gradually decrease in a direction from the lowermost word line pad WLP1 toward the uppermost word line pad WLP4.

A conductive line having a '⊐' shape may be formed by combining the individual double word lines DWL1 to DWL4 and the individual word line pads WLP1 to WLP4.

The method of forming the word line pads WLP1 to WLP4 may include forming a pad-shaped recess by removing the materials (e.g., a dielectric material, a semiconductor material) disposed between the first word line edge portion WE1 and the second word line edge portion WE2, and filling the pad-shaped recess with a conductive material.

The word line stack WLS may further include inter-layer dielectric layers IL, and the inter-layer dielectric layers IL may be disposed between the word line edge portions WLE1 to WLE4. The inter-layer dielectric layers IL may extend laterally to be disposed between the double word lines DWL1 to DWL4. The inter-layer dielectric layers IL may extend laterally in the third direction D3. The inter-layer dielectric layers IL may have different lateral lengths. The lateral length of the inter-layer dielectric layers IL may gradually decrease in a direction from the lowermost inter-layer dielectric layer IL to the uppermost inter-layer dielectric layer IL. The lateral length of the double word lines DWL1 to DWL4 may be the same as the lateral length of the inter-layer dielectric layer IL.

As described above, since the word line pads WLP1 to WLP4 are formed between the first word line edge end portion WE1 and the second word line edge end portion WE2, resistance of the double word lines DWL1 to DWL4 may be improved. Also, it is possible to prevent the contact plugs WC1 to WC4 from being punched by the word line pads WLP1 to WLP4.

Figure 5A:
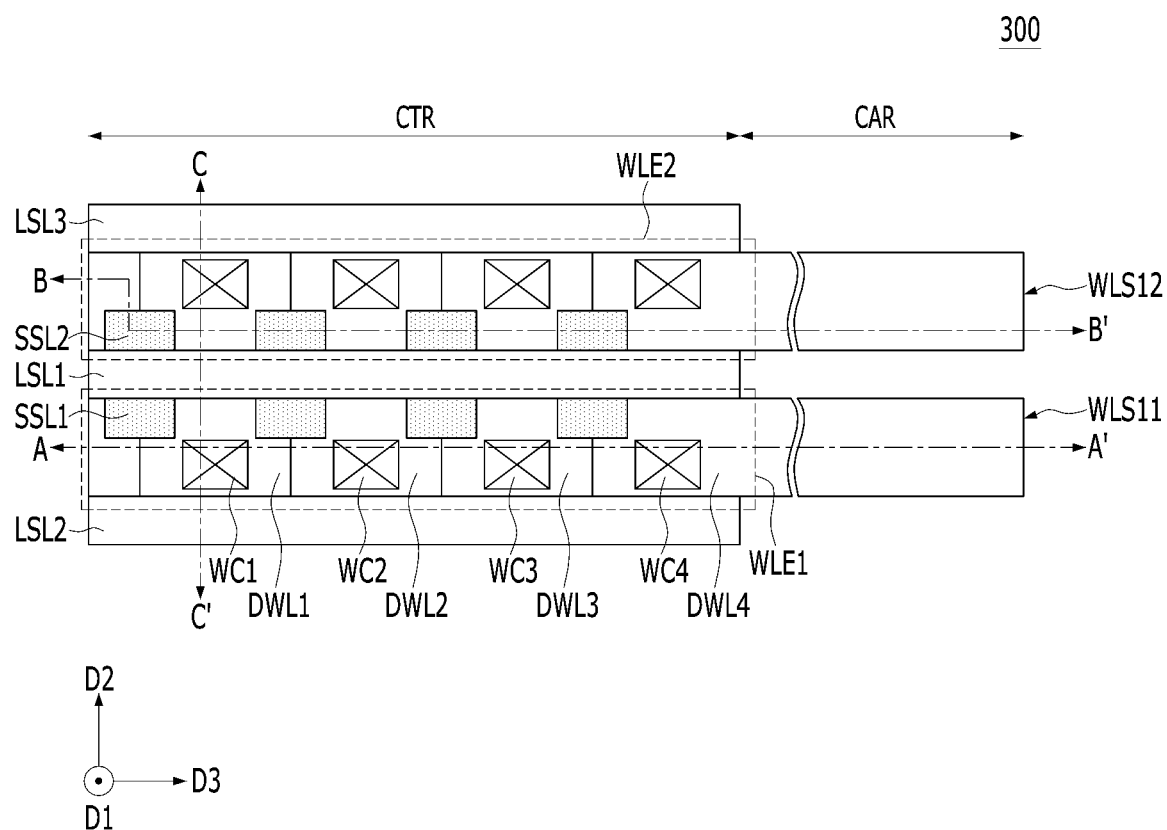
FIG. 5A is a schematic plan view illustrating a semiconductor device in accordance with another embodiment of the present invention.
Figure 5B:
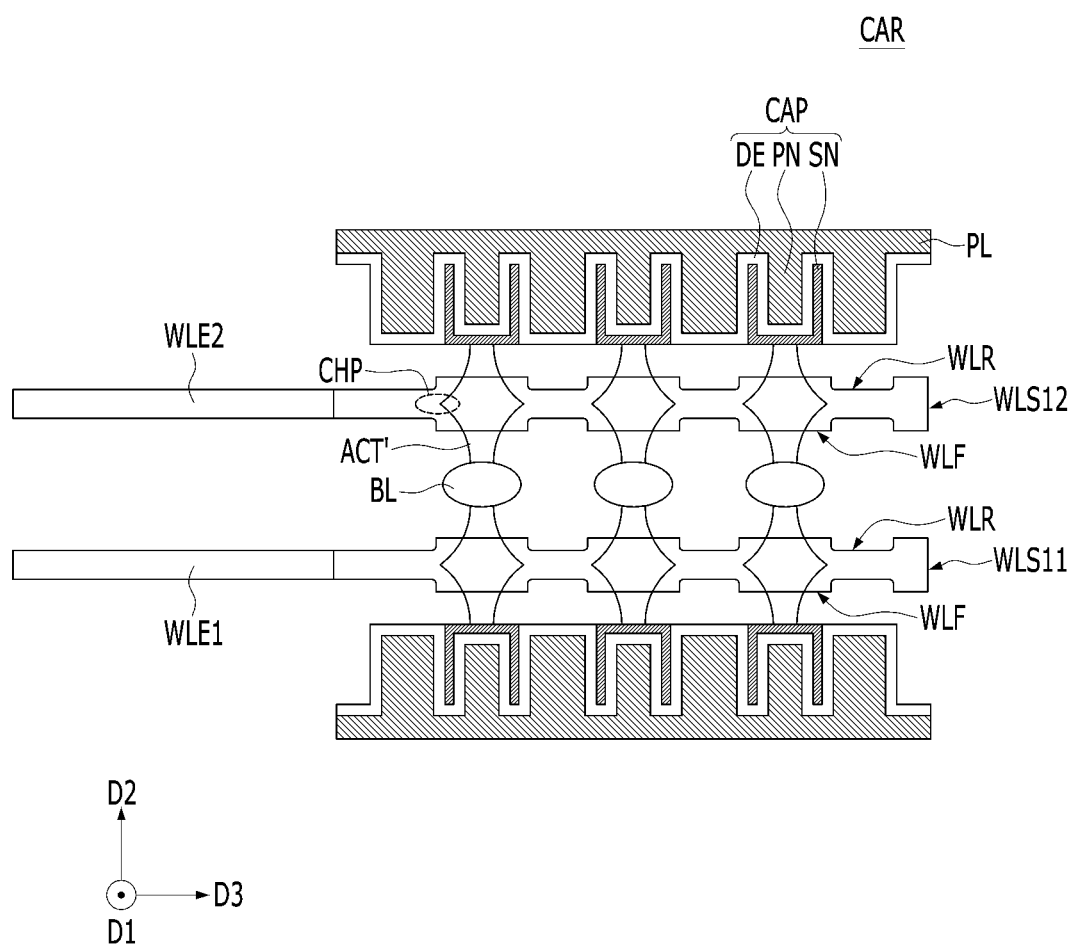
FIG. 5B is a detailed layout diagram of the cell array portion of FIG. 5A.
Figure 6:
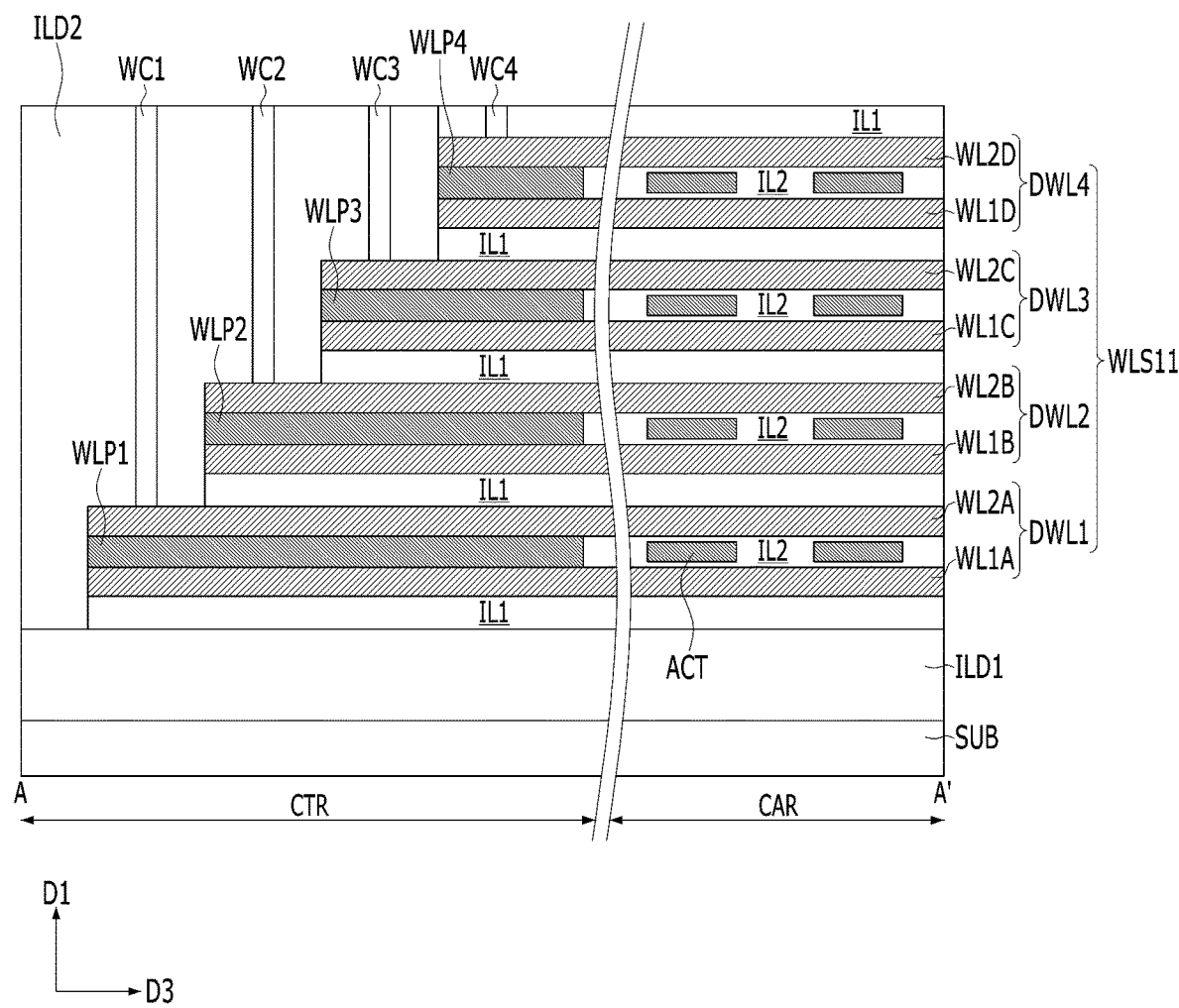
FIG. 6 is a cross-sectional view taken along a line A-A' of FIG. 5A.
Figure 7:
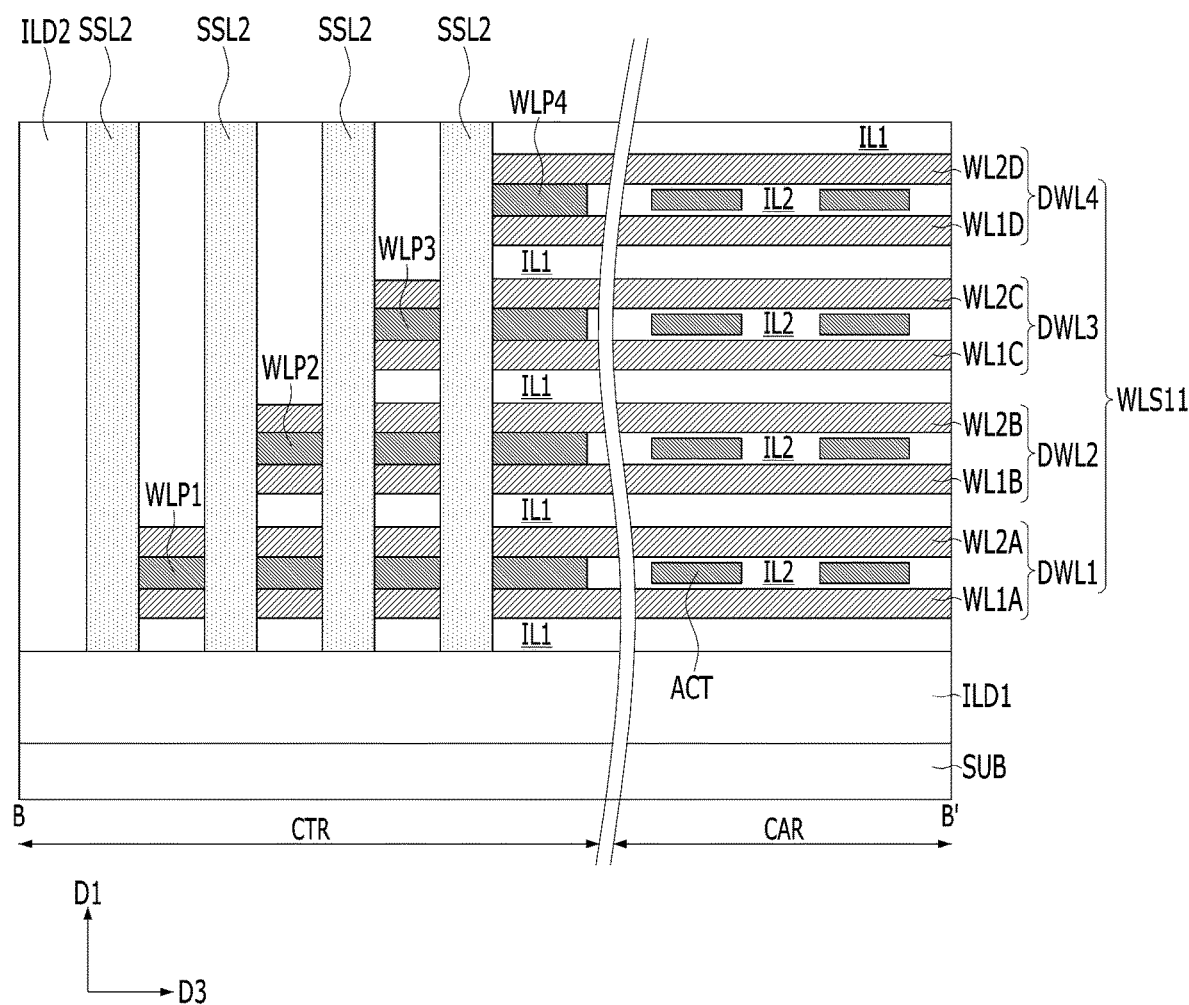
FIG. 7 is a cross-sectional view taken along a line B-B' of FIG. 5A.
Figure 8:
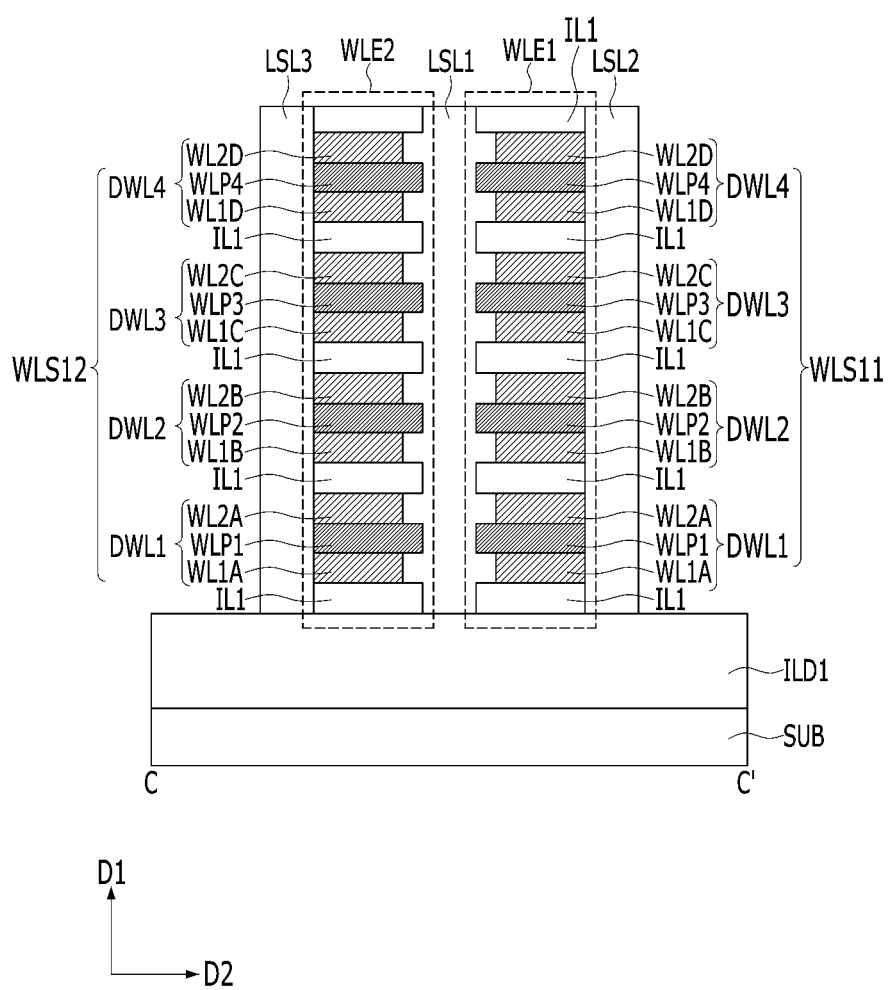
FIG. 8 is a cross-sectional view taken along a line C-C' of FIG. 5A.

FIG. 5A is a schematic plan view illustrating a semiconductor device in accordance with another embodiment of the present invention. FIG. 5B is a detailed layout diagram of the cell array portion of FIG. 5A. FIG. 6 is a cross-sectional view taken along a line A-A' of FIG. 5A. FIG. 7 is a cross-sectional view taken along a line B-B' of FIG. 5A. FIG. 8 is a cross-sectional view taken along a line C-C' of FIG. 5A. In FIGS. 5A to 8, detailed descriptions on the constituent elements also appearing in FIGS. 1 to 4 will be omitted.

Referring to FIGS. 5A to 8, the semiconductor device 300 may include a cell array portion CAR and a contact portion CTR. The memory cells MC of the memory cell array MCA as shown in FIGS. 3 and 4 may be disposed in the cell array portion CAR, and the edge portion WLE of the memory cell array MCA as shown in FIGS. 3 and 4 may be disposed in the contact portion CTR. A plurality of contact plugs WC1 to WC4 may be further disposed in the contact portion CTR. The semiconductor device 300 may include a plurality of word line stacks WLS11 and WLS12, and each of the word line stacks WLS11 and WLS12 may include a plurality of double word lines DWL1 to DWL4. The double word lines DWL1 to DWL4 may be vertically stacked in the first direction D1. The double word lines DWL1 to DWL4 may extend laterally in the third direction D3.

Each of the word line stacks WLS11 and WLS12 may include word line edge portions WLE1 and WLE2. Each of the word line edge portions WLE1 and WLE2 may have a stepped shape, and the stepped shape may be defined in the contact portion CTR. A plurality of word line pads WLP1 to WLP4 may be disposed in the contact portion CTR. The word line pads WLP1 to WLP4 may extend laterally in the third direction D3. The lateral length may gradually decrease in a direction from the lowermost word line pad WLP1 toward the uppermost word line pad WLP4. The contact plugs WC1 to WC4 may be respectively coupled to the word line edge portions WLE1 and WLE2.

The semiconductor device 300 may further include large slits LSL1, LSL2, and LSL3, and the large slits LSL1, LSL2, and LSL3 may extend in the third direction D3. The word line stacks WLS11 and WLS12 may be disposed between the large slits LSL1, LSL2, and LSL3 in the second direction D2. For example, the first large slit LSL1 may be disposed between the first word line stack WLS11 and the second word line stack WLS12, and the first word line stack WLS11 may be disposed between the first large slit LSL1 and the second large slit LSL2. The second word line stack WLS12 may be disposed between the first large slit LSL1 and the third large slit LSL3.

The semiconductor device 300 may further include small slits SSL1 and SSL2. The small slits SSL1 and SSL2 may extend vertically in the first direction D1 and may contact one-side sidewalls of the word line edge portions WLE1 and WLE2, respectively. The small slits SSL1 and SSL2 may pass through the one-side sidewalls of the word line edge portions WLE1 and WLE2. The first small slits SSL1 may pass through the one-side sidewall of the first word line edge portion WLE1, and the second small slits SSL2 may pass through the one-side sidewall of the second word line edge portion WLE2. The first and second small slits SSL1 and SSL2 may directly contact the first large slit LSL1.

The word line edge portions WLE1 and WLE2 and the word line pads WLP1 to WLP4 may be supported by the large slits LSL1, LSL2 and LSL3 and the small slits SSL1 and SSL2. The large slits LSL1, LSL2 and LSL3 and the small slits SSL1 and SSL2 may be referred to as supporters. The large slits LSL1, LSL2 and LSL3 and the small slits SSL1 and SSL2 may be formed of a dielectric material.

Referring back to FIG. 8, the first large slit LSL1 may include a plurality of protrusions directly contacting first and second word lines WL1A to WL1D and WL2A to WL2D. The lateral lengths of the first and second word lines WL1A to WL1D and WL2A to WL2D in the second direction D2 may be smaller than the lateral lengths of the word line pads WLP1 to WLP4 in the second direction D2.

The first and second word line stacks WLS11 and WSL12 may be disposed over a substrate SUB, and a first inter-layer dielectric layer ILD1 may be disposed between the first word line stack WLS11 and the second word line stack WSL12.

The first and second word line stacks WLS11 and WLS12 may include a plurality of double word lines DWL1 to DWL4. The first double word line DWL1 may include a first word line WL1A and a second word line WL2A. The second double word line DWL2 may include a first word line WL1B and a second word line WL2B. The third double word line DWL3 may include a first word line WL1C and a second word line WL2C. The fourth double word line DWL4 may include a first word line WL1D and a second word line WL2D. A first lateral level dielectric layer IL1 may be disposed between the double word lines DWL1 to DWL4. In the cell array portion CAR, a plurality of active layers ACT may be disposed between the first word lines WL1A to WL1D and the second word lines WL2A to WL2D. A second lateral level dielectric layer IL2 may be disposed between the active layers ACT in the cell array portion CAR. In the contact portion CTR, word line pads WLP1 to WLP4 may be disposed between the first word lines WL1A to WL1D and the second word lines WL2A to WL2D. Contact plugs WC1 to WC4 may be coupled to the second word lines WL2A to WL2D, respectively. The contact plugs WC1 to WC4 may pass through the second inter-layer dielectric layer ILD2. The second inter-layer dielectric layer ILD2 may cover the edge portions WLE1 and WLE2 of the word line stacks WLS11 and WLS12.

FIG. 5B is a detailed plan view of the cell array portion CAR, and the cell array portion CAR may include first and second word line stacks WLS11 and WLS12, active layers ACT', bit lines BL, capacitors CAP, and plate lines PL. The bit lines BL may extend vertically in the first direction D1. The active layers ACT' may extend laterally in the second direction D2. The first and second word line stacks WLS11 and WLS12 may extend laterally in the third direction D3. The cell array portion CAR may have a mirror-type structure in which the bit lines BL are shared.

Referring back to FIGS. 5A and 5B, the first and second word line stacks WLS11 and WLS12 in the cell array portion CAR may include a notch-shaped sidewall from the perspective of a plan view. Sidewalls of the edge portions WLE1 and WLE2 of the first and second word line stacks WLS11 and WLS12 extending from the cell array portion CAR may have a linear shape. Each of the word line stacks WLS11 and WLS12 of the cell array portion CAR may include a notch-shaped sidewall extending in the third direction D3 while facing each other. Also, the double word lines DWL1 to DWL4, the first word lines WL1A to WL1D, and the second word lines WL2A to WL2D may include the notch-shaped sidewalls extending in the third direction D3. Each of the notch-shaped sidewalls may include flat surfaces WLF and recess surfaces WLR. The flat surfaces WLF and the recess surfaces WLR may be alternately repeated in the third direction D3. The flat surfaces WLF1 may be flat sidewalls, and the recess surfaces WLR may be recessed sidewalls.

In the first word line stack WLS11, the distance between the flat surfaces WLF facing in the second direction D2 may be longer than the distance between the recess surfaces WLR facing in the second direction D2. According to another embodiment of the present invention, the recess surfaces WLR may have a round shape. For example, the recess surfaces WLR may have a hemispherical notch shape, individually, and may be symmetrical to each other in the second direction D2.

In the contact portion CTR, the sidewalls of the edge portions WLE1 and WLE2 of the first and second word line stacks WLS11 and WLS12 may have a linear shape in which the flat surfaces extend.

The active layer ACT' may include channel protrusions CHP, and the channel protrusions CHP may vertically overlap with the first and second word line stacks WLS11 and WLS12. The active layer ACT' may have a rhombus shape.

FIGS. 9 to 13 illustrate a method for fabricating a semiconductor device in accordance with an embodiment of the present invention.

Referring to FIGS. 9 to 13, the method for fabricating a semiconductor device may include forming an inter-layer dielectric layer 12 over a substrate 11, forming a stack body SB in which a first lateral level dielectric layer 13, a first word line 16A, an active layer 15, a gate dielectric layer 14, a second word line 16B, and a second lateral level dielectric layer 13 are stacked in the mentioned order, forming a pad-shaped opening 21 between the first word line 16A and the second word line 16B by removing the active layer 15 and the gate dielectric layer 14, and forming a word line pad 22 that fills the pad-shaped opening 21. The forming of the pad-shaped opening 21 may include forming a slit-shaped opening that divides the stack body SB into a first word line edge portion WLE1 and a second word line edge portion WLE2, forming an insulating slit 17 that fills the slit-shaped opening, forming a pad separation opening 20 between the first word line edge portion WLE1 and the second word line edge portion WLE2 by etching a portion of the slit 17, and removing the active layer 15, the gate dielectric layer 14, and the active layer 15 through the pad separation opening 20. The pad separation opening 20 may extend perpendicularly to the surface of the substrate 11, and the pad-shaped opening 21 may extend laterally from the pad separation opening 20.

Hereinafter, a method for fabricating a semiconductor device in accordance with an embodiment of the present invention will be described with reference to FIGS. 5A to 8 and FIGS. 9 to 13.

Figure 9:
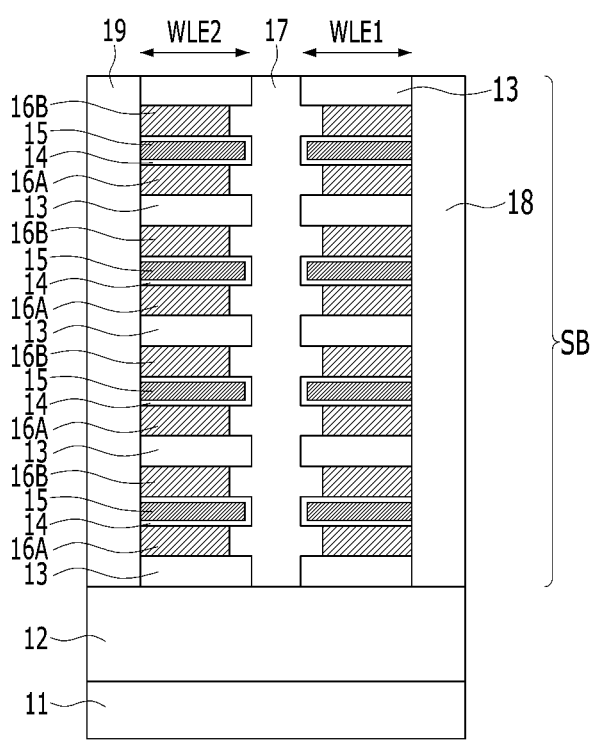
FIGS. 9 to 13 illustrate a method for fabricating a semiconductor device in accordance with an embodiment of the present invention.

Referring to FIG. 9, an inter-layer dielectric layer 12 may be formed over the substrate 11. The inter-layer dielectric layer 12 may include a dielectric material. The inter-layer dielectric layer 12 may include silicon oxide, silicon nitride, or a combination thereof.

First and second word line edge portions WLE1 and WLE2 may be formed over the inter-layer dielectric layer 12. Each of the first and second word line edge portions WLE1 and WLE2 may include the lateral level dielectric layers 13, the active layers 15, the gate dielectric layers 14, and the first and second word lines 16A and 16B. As shown in FIGS. 5A and 5B, the first and second word line edge portions WLE1 and WLE2 may be end portions of the first and second word line stacks WLS11 and WLS12. The first and second word line edge portions WLE1 and WLE2 may be end portions of the first and second word lines WL1 and WL2.

First to third large slits 17, 18, and 19 passing through the first and second word line edge portions WLE1 and WLE2 may be formed. The first large slit 17 may be disposed between the first word line edge portion WLE1 and the second word line edge portion WLE2. The first large slit 17 may divide the stack body SB into a first word line edge portion WLE1 and a second word line edge portion WLE2. The first large slit 17 may include a dielectric material that fills the slit-shaped opening (not given with a reference numeral) between the first word line edge portion WLE1 and the second word line edge portion WLE2. The first to third large slits 17, 18, and 19 may include silicon oxide, silicon nitride, or a combination thereof. As shown in FIGS. 5A and 5B, small slits SSL1 and SSL2 may be simultaneously formed when the first to third large slits 17, 18, and 19 are formed. After the first to third large slits 17, 18, and 19 are formed, first and second word line stacks WLS11 and WLS12 including the first and second word line edge portions WLE1 and WLE2 may be formed.

The forming of the first and second word lines 16A and 16B may include repeatedly stacking sub-stacks, each of which includes a lateral level dielectric layer 13, a sacrificial layer, an active layer 15 and a lateral level dielectric layer 13 that are stacked many times in the mentioned order, over the inter-layer dielectric layer 12, and replacing the sacrificial layers with the gate dielectric layers 14 and the first and second word lines 16A and 16B. The lateral level dielectric layers 13 may be disposed between the active layers 15 and the lateral level dielectric layers 13, and gate dielectric layers 14 may be formed on the surfaces of the active layers 15. The first and second word lines 16A and 16B may be disposed between the lateral level dielectric layer 13 and the active layers 15 over the gate dielectric layers 14.

Figure 10:
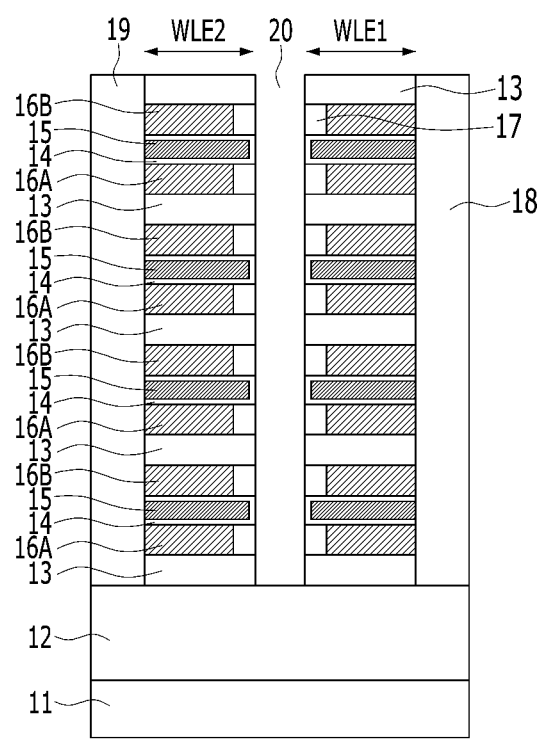

Referring to FIG. 10, a pad separation opening 20 passing through a portion of the first large slit 17 may be formed. The pad separation opening 20 may pass through a portion of the first large slit 17 and extend perpendicularly to the substrate 11. The pad separation opening 20 may expose the gate dielectric layers 14 and the lateral level dielectric layers 13. After the pad separation opening 20 is formed, the first large slit 17 may remain on one-side sidewall of the first and second word lines 16A and 16B.

Figure 11:
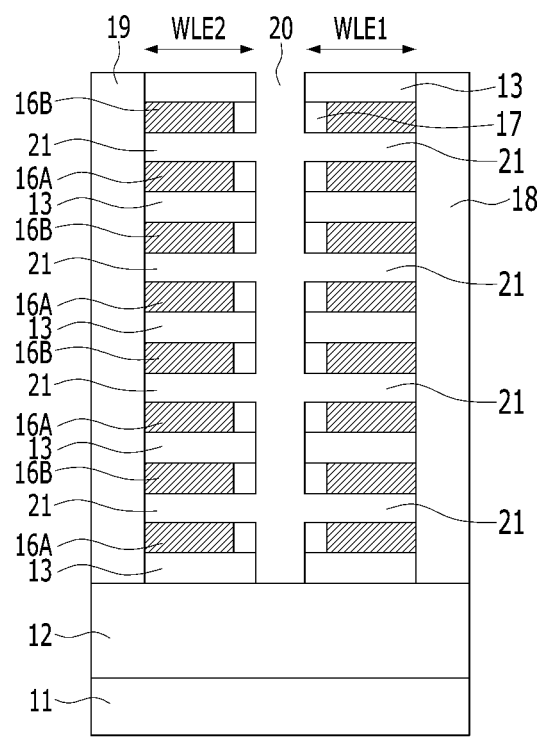

Referring to FIG. 11, the gate dielectric layers 14 and the active layer 15 may be selectively etched through the pad separation opening 20.

Pad-shaped openings 21 may be formed between the first word line 16A and the second word line 16B by the above series of etching processes. The pad-shaped openings 21 may extend laterally from the pad separation opening 20. The pad-shaped openings 21 may be disposed in each of the first word line edge portion WLE1 and the second word line edge portion WLE2.

A stack of the lateral level dielectric layers 13, the first and second word lines 16A and 16B, and the pad-shaped openings 21 may be disposed in each of the first word line edge portion WLE1 and the second word line edge portion WLE2.

Figure 12:
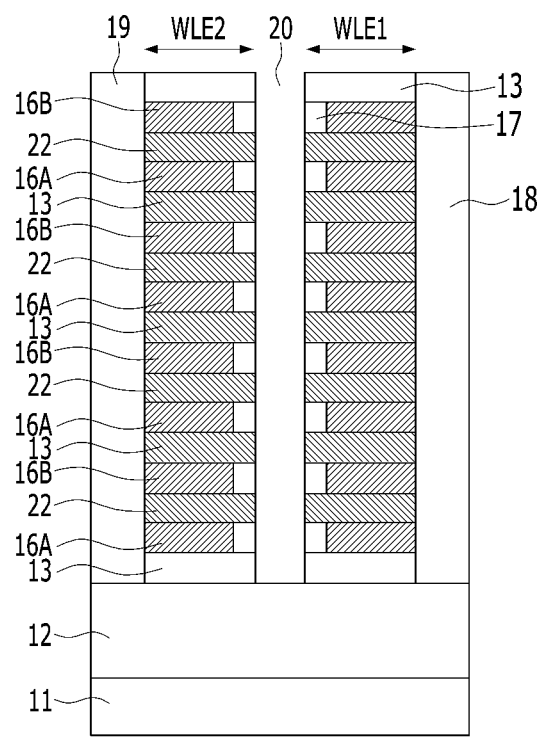

Referring to FIG. 12, word line pads 22 filling the pad-shaped openings 21 may be formed. To form the word line pads 22, deposition and etching of a metal-based material may be performed. The word line pads 22 may directly contact the first and second word lines 16A and 16B. The word line pads 22 may be disposed between the first word line 16A and the second word line 16B. The word line pads 22 may be disposed in the first and second word line edge portions WLE1 and WLE2.

The first and second word line edge portions WLE1 and WLE2 may include a stack of the first word line 16A, the word line pad 22 and the second word line 16B.

Figure 13:
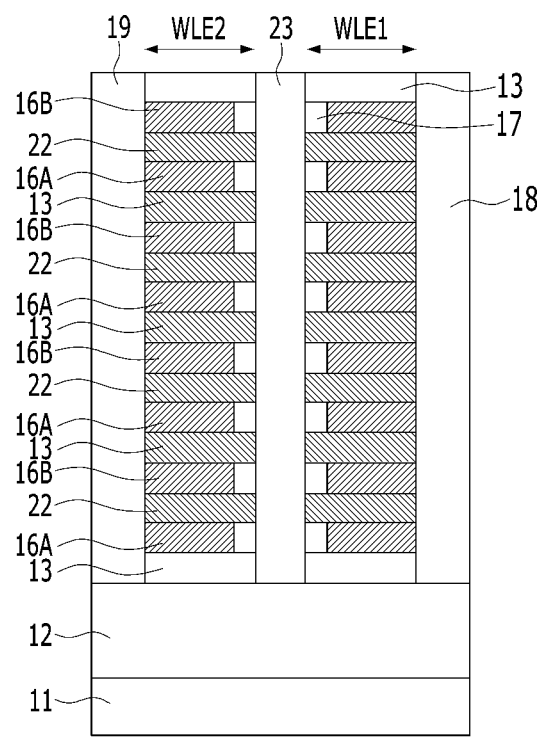

Referring to FIG. 13, a slit 23 filling the pad separation opening 20 may be formed. The slit 23 may be formed of a dielectric material.

According to the above-described embodiments, since the active layers between the first and second word lines 16A and 16B are replaced with the word line pads 22 to form thick word line pads, the resistance of double word lines may be improved.

According to the embodiment of the present invention, word line resistance may be improved as word line pads are formed thick by replacing the active layers between the double word lines.

While the present invention has been described with respect to the specific embodiments, it will be apparent to those skilled in the art that various changes and modifications may be made without departing from the spirit and scope of the invention as defined in the following claims.

What is claimed is:

1. A semiconductor device, comprising:
   a conductive line stack including a plurality of double conductive lines stacked over a substrate in a direction perpendicular to a surface of the substrate;
   conductive line pads laterally oriented between edge portions of each of the double conductive lines; and
   a contact plug contacting the edge portions of the double conductive lines.

2. The semiconductor device of claim 1, wherein the double conductive lines have different lateral lengths.

3. The semiconductor device of claim 1, wherein the conductive line pads have different lateral lengths.

4. The semiconductor device of claim 1, wherein the edge portions of the double conductive lines have a stepped shape.

5. The semiconductor device of claim 1, wherein the edge portions of the double conductive lines and the conductive line pads are in direct contact.

6. The semiconductor device of claim 1, wherein each of the conductive line pads includes a first end portion and a second end portion,
   the first end portions of the conductive line pads are vertically self-aligned, and
   the second end portions of the conductive line pads are non-aligned and have a stepped shape.

7. The semiconductor device of claim 1, wherein the double conductive lines and the conductive line pads include a metal-based material.

8. The semiconductor device of claim 1, further comprising:
a conductive layer disposed at the same lateral level as the conductive line pads while being disposed between the double conductive lines.

9. The semiconductor device of claim 1, wherein the double conductive lines include a double word line.

10. A semiconductor device, comprising:
a word line stack including a plurality of double word lines that are stacked over a substrate in a direction perpendicular to a surface of the substrate;
word line pads that are laterally oriented between edge portions of each of the double word lines;
a plurality of active layers disposed between the double word lines and laterally spaced apart from each other in a direction that the double word lines extend;
a bit line commonly coupled to first end portions of the active layers and extending in a direction perpendicular to the surface of the substrate; and
capacitors respectively coupled to the second end portions of the active layers.

11. The semiconductor device of claim 10, wherein the double word lines have different lateral lengths, and
the word line pads have different lateral lengths.

12. The semiconductor device of claim 10, wherein the edge portions of the double word lines are self-aligned.

13. The semiconductor device of claim 10, wherein the edge portions of the double word lines and the word line pads are in direct contact.

14. The semiconductor device of claim 10, wherein the edge portions of the double word lines and the word line pads have a stepped shape.

15. The semiconductor device of claim 10, wherein the double word lines and the word line pads include a metal-based material.

16. The semiconductor device of claim 10, wherein each of the word line pads includes a first end portion and a second end portion,
the first end portions of the word line pads are vertically self-aligned, and
the second end portions of the word line pads are non-aligned and have a stepped shape.

17. The semiconductor device of claim 10, further comprising:
a plurality of lateral level dielectric layers disposed between the double word lines.

18. A semiconductor device, comprising:
a plurality of double conductive lines stacked over a substrate, each double conductive line including a pair of first conductive lines facing each other;
a plurality of conductive line pads, each conductive line pad being disposed between a respective pair of the first conductive lines at edge portions of each of the double conductive lines;
a plurality of contact plugs contacting the edge portions of the double conductive lines, respectively;
a plurality of active layers disposed between the double conductive lines, respectively, and laterally spaced apart from each other in a direction that the double conductive lines are stacked;
a second conductive line commonly coupled to first end portions of the active layers and extending in a direction perpendicular to the surface of the substrate; and
a plurality of capacitors respectively coupled to second end portions of the active layers.

19. The semiconductor device of claim 18, wherein each active layer has a rhombus shape with double channel protrusions vertically overlapping with the double conductive lines.

20. The semiconductor device of claim 19, wherein the first conductive lines are word lines and the second conductive line is a bit line.

* * * * *